United States Patent [19]

Hiyama et al.

[11] Patent Number: 4,885,491
[45] Date of Patent: Dec. 5, 1989

[54] UNSTABLE VIBRATION PREVENTION APPARATUS FOR MAGNETIC BEARING SYSTEM

[75] Inventors: Hirokuni Hiyama, Tokyo; Katsuhide Watanabe, Kawasaki; Atsushi Nakajima, Koganei; Chikara Murakami, Hachioji, all of Japan

[73] Assignees: National Aerospace Laboratory, Tokyo; Ebara Research Co., Ltd., Fujisawa; Ebara Corporation, Tokyo, all of Japan

[21] Appl. No.: 206,464

[22] Filed: Jun. 14, 1988

[30] Foreign Application Priority Data

Oct. 28, 1987 [JP] Japan ................................. 62-270352

[51] Int. Cl.[4] ........................................... F16C 39/06
[52] U.S. Cl. ................................... 310/90.5; 324/207
[58] Field of Search ............... 310/90.5; 324/207, 208, 324/225

[56] References Cited

U.S. PATENT DOCUMENTS

| | | |
|---|---|---|
| 3,787,100 | 1/1974 | Habermann et al. . |
| 3,937,533 | 2/1976 | Veillette . |
| 4,121,143 | 10/1978 | Habermann et al. . |
| 4,626,754 | 12/1986 | Habermann ........................ 310/90.5 |
| 4,686,404 | 8/1987 | Nakazeki et al. .................. 310/90.5 |

FOREIGN PATENT DOCUMENTS

| | | |
|---|---|---|
| 0157693 | 10/1985 | European Pat. Off. . |
| 0157694 | 10/1985 | European Pat. Off. ........... 310/90.5 |
| 0185765 | 7/1986 | European Pat. Off. . |
| 0193609 | 9/1986 | European Pat. Off. . |
| 0201894 | 11/1986 | European Pat. Off. . |
| 2336602 | 7/1977 | France . |
| 58-122299 | 7/1983 | Japan . |
| 59-500979 | 5/1984 | Japan . |
| 0500979 | 5/1984 | Japan . |
| 1458687 | 12/1976 | United Kingdom . |
| 2109596A | 6/1983 | United Kingdom . |
| 2129582A | 5/1984 | United Kingdom . |

OTHER PUBLICATIONS

"Aktive Lagerung Umlaufender Korper", Werner Braun, 1974.

Primary Examiner—R. Skudy
Attorney, Agent, or Firm—Armstrong, Nikaido, Marmelstein, Kubovcik & Murray

[57] ABSTRACT

An active type magnetic bearing system includes magnetic bearings for suspending a rotary body to permit it to rotate about its rotational axis. A control system supplies the magnetic bearings with signals to control the radial position of the rotary body, and comprises displacement detecting circuits for detecting any displacement of the radial position of the rotary body and a control circuit for producing a control signal which serves to suppress any unstable vibration of the rotary body.

9 Claims, 4 Drawing Sheets

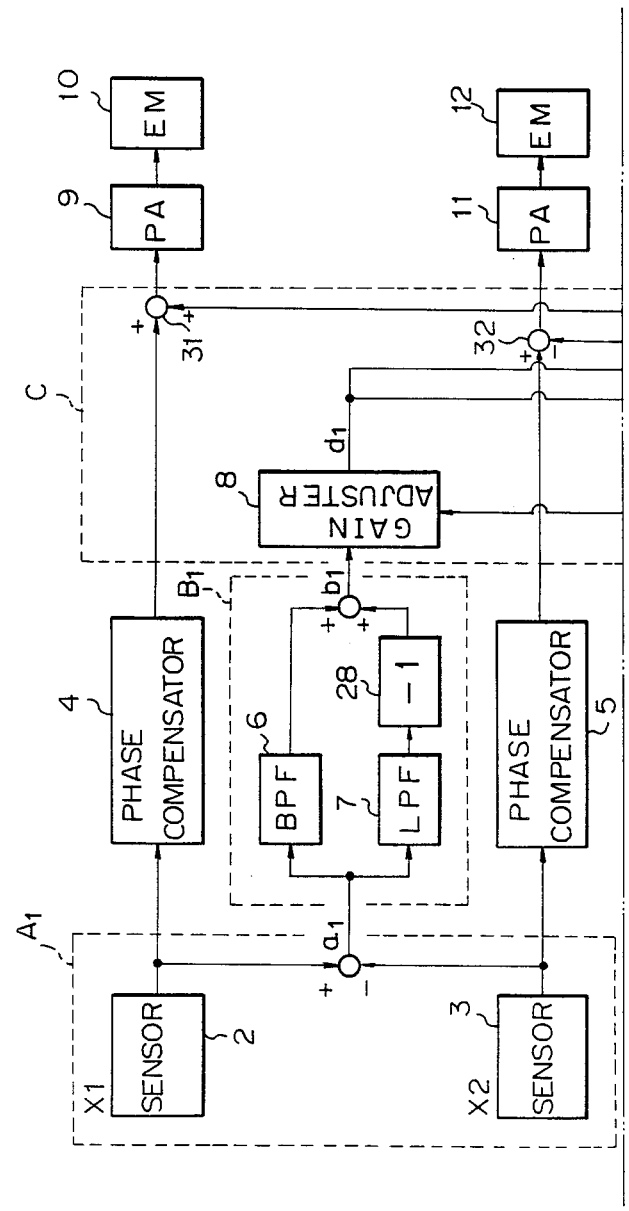

UNSTABLE VIBRATION PREVENTION APPARATUS FOR MAGNETIC BEARING SYSTEM

BACKGROUND OF THE INVENTION

1. Field of the Invention:

The present invention generally relates to a magnetic bearing system, and more particularly, to an unstable vibration prevention apparatus designed for an active type magnetic bearing system adapted to control a magnetic force by using an electronic circuit.

2. Description of the Prior Art:

A magnetic bearing is capable of suspending an object with a magnetic force in a completely non-contact state and therefore has a wide variety of features. Such magnetic bearings show the following advantages by virtue of the absence of mechanical contact:

(1) no abrasion is created, and hence the life thereof is semipermanent;
(2) both vibrations and noises are small with no abrasion occurring;
(3) rotational drag (a loss associated with rotation) is small, and high-speed rotation can be attained;
(4) magnetic bearings are usuable under such special circumstances as operataion in a vacuum, at relatively high and low temperatures and in a radioactive atmosphere; and
(5) a perfectly oil-free system is practicable due to the absence of any need for lubricants.

In addition, a control type magnetic bearing adapted to control a magnetic force has the following advantages:

(1) the stiffness and damping characteristics of the bearing are freely adjustable;
(2) since a wide bearing-gap is capable of being set, the position of the rotor can be moved with minute precision; and
(3) a displacement sensor can be built-in the system, which arrangement facilitates the monitoring of the system's operation.

In the conventional active type magnetic bearing system wherein an electronic circuit serves to control the magnetic force to adjust the radial position of a rotary body, instability of the rotary body becomes more marked as the rotational frequency of the rotary body increases. In the range of low stiffness and damping within lower frequencies, whirling (unstable vibratin) of the coniccal mode in which the direction of the whirling is opposite to the rotaational direction is in some cases generated. Morever, in the range of higher frequencies, whirling of the conical mode wherein the whirling is effected in the same direction as that of rotation is likewise produced if the damping force decreases due to internal damping or other causes. This kind of whirling will be explained more fully laater. Such unstable vibration is propagated to a casing via a fixed member on which the stator of the magnetic bearing is mounted, thereby causing resonance of the structure. This results in augmentation of the control current of the magnetic bearing, which in turn results in the generation of heat. In addition, the unstable vibration sometimes abruptly diverges and an uncontrollable state is thereby induced.

Such unstable vibration can be prevented by increasing the gain of a control system to heighten the stiffness of a bearing and increment the damping. In order to increase the gain, however, the capacity of control circuit must be raised. Such an increase in the capacity of the control circuit raises the problem of increased vibration during the rottion and excited resonance of the structure.

Since the above-described unstable vibration corresponds to the self-excited vibraion of the rotor, if the natural frequency causing an unstable vibration is set to be within a proper range at the design stage, such unstable vibration can be avoided. However, when a variety of constraints exist in regard to the structure of the rotary body and the like, in most cases it is difficult to arbitrarily set the natural frequency.

SUMMARY OF THE INVENTION

The present invention has been made in the light of the above-mentioned defects inherent in the prior art and has the object of providing an unstable vibration prevention apparatus capable of effectively attenuating or preventing unstable vibration of a rotary body.

After conducting various studies, the inventors have found that in order to prevent an unstable vibration (forward rotational nutation or backward rotatinal precession) of a rotational axis, it is necessary to decide the mode of the unstable vibrations and to apply to a fundamental control circuit a signal which is advanced by 90° in the whirling direction of the unstable vibration—i.e., a signal the phase of which is advanced by 90° in the direction of displacement of the unstable vibration on the rotational axis.

In other words, in order to prevent the unstable vibration, it is necessary to take the steps of:
assuming two control axes perpendicular to the rotational axis of a rotary body;
deciding a whirling direction of the rotational axis in one of the control axes;
producing a signal indicating such a whirling direction; and
adding this signal to a signal indicating a displacement of the rotational axis detected in the other of the control axes.

The signal indicating the whirling direction deteced in one axis is considered, with respect to the other axis, as a signal which is advanced by 90° in the direction of the whirling, or, a signal which is advanced by 90° with respect to the displacement detected in the other axis. Since the signal which is advanced by 90° in the direction of unstable vibration displacement corresponds to a signal proportional to the velocity, a control force proportional to this signal can serve as an damping force. Consequently, the signal advanced by 90° is applied to the control circuit and then added to the other signal. It therefore follows that the damping force with respect to the whirling increases.

In an active type magnetic bearing according to the present invention, if whirling, viz., unstable vibration, is generated during rotation of a rotary body, the slant angle of the whirling of the rotary body is a first detected from the outputs of two displacement sensors disposed at different positions in the direction of the rotational axis. This step allows a decision to be made as to whether the unstable vibration being generated is in the parallel mode or the conical mode. If the unstable vibration is in the parallel mode, the slant angle of the whirling is 0°, and an output signal of a detecting circuit is also zero. When the whirling is in the conical mode, the output from the detecting circuit will not be zero. The nex step is to decide whether the whirling direction of the unstable vibration is the same as the rotational direction of the rotary body (a forward rotation) or is opposite to the rotational direction (a backward rotation). This is determined by passing the output signal of the detecting circuit through a low-pass filter and a band-pass filter. This decision utilizes he fact that, in the output signal of the detecting circuit, a high frequency band region includes the frequency of the whirling that takes place in the same direction as that of the rotary body's rotation (the forward rotation), while a low frequency band region includes the frequency of the whirling that occurs in the opposite direction (the backward rotation). Based upo the above-mentioned decisions, a signal is produced indicating whether the unstable vibration is defined as whirling in the conical mode of the forward rotation of whirling in the conical mode of the backward rotation.

In the plane perpendicular to the plane that includes the above-mentioned sensors, a decision is also made as to whether the whirling direction of the unstable vibration is forward or backward, and a signal indicating the whirling direction is thus generated.

The signal which indicates the whirling direction with respect to one of the planes is added to signals which indicate the vibration displacement of the rotational axis in the other plane. Thus, the signal indicating he whirling direction is considered as a signal which is advanced by 90° in the whirling direction, i.e., a signal which is advanced 90° with respect to the displacement of the rotational axis, and is added to a signal indicating the displacement of the rotational axis. This means that a force which is advanced by 90° in the direction of displacement and is proportional to the rotational speed of the rotary body is added to increase the damping force with respect to the whirling.

Because the instability decreases or decreases as the rotational frequency of the rotary body increases or decreases, an adjuster is provided to adequately augment or reduce the signal indicating the whirling direction in response to any increase or decrease in the rotational frequency of the rotary body, whereby optimum control can be achieved in correspondence with any variation in the rotational frequency.

The above and other related objects, features and advantages of the invention will become more apparent on reading the following detailed description with reference to the accompanying drawings.

BRIEF DESCRIPTION OF THE DRAWINGS

FIG. 3 includes FIGS. 3A and 3B show a block which diagram illustrating one example of the constitution of a control circuit of the type depicted in FIG. 1.

In these figures, like elements and components are marked with the same reference numerals or symbols.

DETAILED DESCRIPTION OF THE PRFERRED EMBODIMENTS

Figure 1:
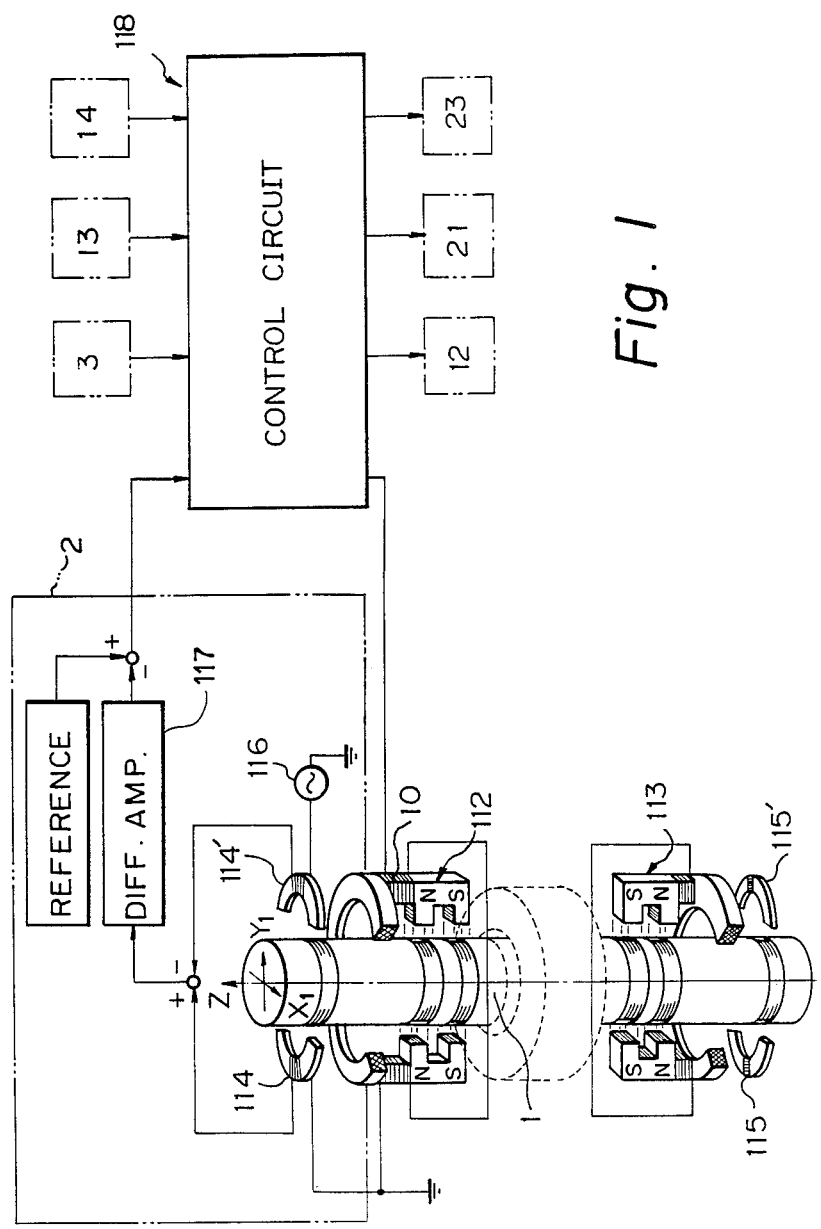
FIG. 1 shows an embodiment of an unstable vibration prevention apparatus for use with an active type magnetic bearing according to the present invention.

An outline description of the construction of a magnetic bearing system according to the present invention will hereinafter be given with reference to FIGS. 1 and 2. A rotary body generally indicated at 1 is suspended by radial magnetic bearings 112 and 113 at two positions in the direction of the axis Z so that the rotary body is rotatable about the axis Z by means of a motor (depicted by a dotted line). The respective magnetic bearings 112 and 113 include a combination of permanent magnes and electromagnets. The permanent magnets operate to flow a bias flux through control magneic pole pieces to make the relationship between the suspending force and the flux density linear. The position control of the rotary body 1 is effected by making addition or subtraction between the bias flux by the permanent magnets and the flux generated by the electromagnets. As illustrated in FIG. 2, planes perpendicular to the rotational axis Z at both ends of the rotary body 1 are assumed; and two pairs of axes $X_1$ an $Y_1$, and $X_2$ and $Y_2$ which are perpendicular to each other are set on these planes. These four axes are considered as control axes with respect to the rotary body 1. More specifically, displacement sensors 2, 3, 13, and 14 are disposed on the control axes $X_1$, $X_2$, $Y_1$ and $Y_2$, respectively; and ouputs from the displacement sensors are supplied to a control circuit 118. The construction and operation of the control circuit 118 will be explained later in detail. Electromagnets 10, 12, 21, and 23 are provided on the control axes $X_1$, $X_2$, $Y_1$ and $Y_2$ so as to control the position of the rotary body 1. The control circuit 118 serves to process the signals transmitted from the displacement sensors 2, 3, 13, and 14, and, as a result of this processing, signals are fed back to the electromagnets 10, 12, 21 and 23, thereby obtaining the static and dynamic stabilities of the rotary body 1.

These displacement sensors are the same in construction. FIG. 1 shows one example of the construction of the displacement sensor 2. The displacement sensor 2 includes a pair of non-contact type series-connected coils 114 and 114' for detecting radial positions. One end of one of the coils 114' is connected to a oscillator 116. The difference between the outputs from the junction of the coils 114 and 114' shows the amount of displacement of the rotary body and is amplified by a differential amplifier 117, which, in turn, compares such a difference with a signal indicating the reference axial position. The difference therebetween is supplied to the control circuit 118. It should be noted that the numerals 115 and 115' designate coils for detecting the radial positions within the displacement sensor 3 disposed on the control axis $X_2$.

As described above, the magnetic bearings 112, 113 have the electromagnets 10, 12, 21 and 23 each combined with permanent magnets to obtain bias magnetic fluxes from these permanent magnets. Since the magnetic bearings 112 and 113 are capable of acquiring the axial restoring force of the rotary body 1 by utilizing the bias magnetic fluxes, no control in the direction of the rotational axis Z is applied to the rotary body 1. It should be noted that magnetic bearings having electromagnets but not permanent magnets may also be used in this embodiment. In such a case the magnetic force generated by the electromagnets is adjusted to control the suspending force.

When the rotary body 1 is rotated about the axis Z by the motor, whirling caused by the unstable vibration of the rotary body 1 is produced in the rotary body 1. The whirling is effected either in the same direction as that of the rotation of the rotary body 1, i.e., in the forward rotation, or in the direction opposite to the direction of rotation of the rotary body 1, viz., in the backward rotation. FIG. 2 schematically shows the form this whirling takes. When rotating the rotary body 1 at an angular velocity w in the direction indicated by an arrow A, the rotary body 1 whirls forward (in the direction indicated by the arrow A) at a slant angle O with respect to the axis Z at an angular velocity $\omega_{nf}$, or whirls backwards (in the backwarad direction relative to the arrow A) at an angular velocity $\omega_{nb}$.

Figure 2:
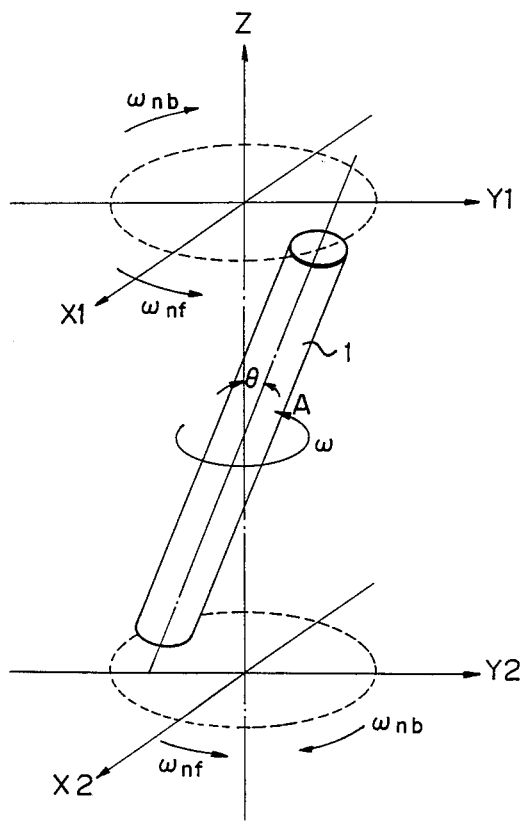
FIG. 2 is an explanatory view depicting the whirling caused by unstable vibration of a rotary body suspended by such an active type magnetic bearing.
Figure 3B:
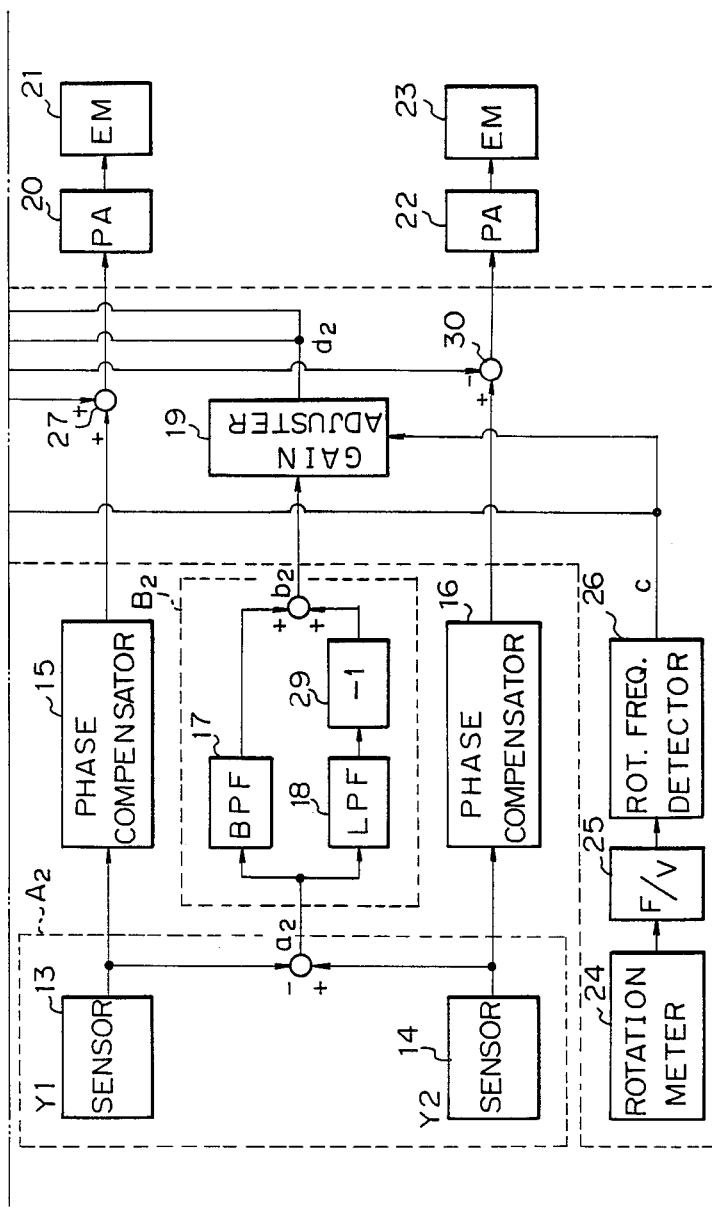

Referring now to FIGS. 3A and 3B which are a block diagram showing the constitution of the control circuit shown in FIG. 1, the above-described displacement sensors 2 and 3 constitute a part of a first slant angle detecting circuit $A_1$, while the displacement sensors 13 and 14 constitute in combination a part of a second slant angle detecting circuit $A_2$. Outputs from these displacement sensors 2, 3, 13 and 14 are supplied to corresponding phase compensators 4, 5, 15 and 16, respectively. These phase compensators are provided to improve the stability of the magnetic bearing control system and serve to secure the phase margin at frequency crossover points. On the other hand, a difference signal $a_1$ representing the difference between the outputs from the displacement sensors 2 and 3 is obtained from a subtraction circuit and is then supplied to a first decision circuit $B_1$. A difference signal $a_2$ representing the difference between the outputs from the displacement sensors 13 and 14 is also obtained from another subtraction circuit and is supplied to a second decision circuit $B_2$. The difference signals $a_1$ and $a_2$ each indicate a slant angle $\theta$ (FIG. 2) with respect to the axis Z of the rotary body 1.

The first and second decision circuits $B_1$ an $dB_2$ are designed to decide whether the rotary body 1 is whirling forward or backwards. These two circuits have the same construction and each include a band-pass filter 6 or 17, a low-pass filter 7 or 18 and a phase inverter 28 or 29 connected to the low-pass filter. If the difference signal $a_1$ or $a_2$ includes a frequency component indicating forward whirling, a signal is output from the band-pass filter 6 or 17. If the difference signal $a_1$ or $a_2$ includes a frequency component indicating backward whirling, a signal is output from the low-pass filter 7 or 18. The output of the first and second decision circuits $B_1$ and $B_2$ is applied to corresponding gain adjusters 8 and 19. The magnitude of these output signal is increased or decreased in accordance with the rotational speed of the rotary body 1. To be specific, the rotational speed of the rotary body is detected by a rotation meter 24. An F/V converter 25 serves to generate a voltage signal corresponding to the thus detected rotational speed. Upon receipt of this voltage signal, a rotational frequency detector 26 outputs a signal c corresponding to the rotational frequency of the rotary body and then applies it to each of the gain adjusters 8 and 19, so that the gain adjusters 8 and 19 increase or decrease the outputs of the decision circuits $B_1$ and $B_2$ as the rotational frequency of the rotary body increases or decreases.

An output signal $d_1$ from the gain adjuster 8 which represents the output signal $b_1$ from the decision circuit $B_1$ after it has been adjusted in accordance with the rotational speed of the rotary body is supplied to adders 27 and 30. An output signal $d_2$ of the gain adjuster 19 which represents the output signal $b_2$ of the decision circuit $B_2$ after it has been adjusted in accordance with the rotational speed of the rotary body is supplied to adders 31 and 32. The adder 27 adds the signal $d_1$ to the output of the phase compensator 15 disposed on the axis $Y_1$, while the adder 30 adds the signal $d_1$ to the output of the phase compensator 16 disposed on the axis $Y_2$. To perform control in the Y direction, the outputs of the adders 27 and 30 are applied through power amplifiers 20 and 22 to electromagnets 21 and 23 on the axes $Y_1$ and $Y_2$, respectively. The adder 31 serves to add the signal $d_2$ to the output of the phase compensator 4 disposed on the axis $X_1$, and the adder 32 adds the signal $d_2$ to the output of the phase compensator 5 disposed on the axis $X_2$. With a view to effecting control in the X direction, the outputs of the adders 31 and 32 are applied through power amplifiers 9 and 11 to electromagnets 10 and 12 provided on the axes $X_1$ and $X_2$, respectively.

Next description will be focused on the operation of the control circuit 118. The description starts with the operation conducted in the case of controlling the rotary body in the direction of the Y-axis.

When controlling the rotary body on the axis Y, the first step is to generate the different signal $a_1$ which represents the difference between the outputs from the displacement sensors 2 and 3 on the axis X in the first slant angle detecting circuit $A_1$ depicted in FIG. 3A, i.e., the signal indicating a slant angle $\theta$ (see FIG. 2) of the rotational axis of the rotary body. If the whirling mode is the parallel mode, the slant angle $\theta = 0°$, and the signal $a_1$ is also zero. If the signal $a_1$ is not zero, the whirling proves to be in the conical mode. Subsequently, the decision circuit $B_1$ decides the frequency component of the output $a_1$ of the slant angle detecting circuit $A_1$ in cooperation with the band-pass filter 6 and the low-pass filter 7. A determination is made as to whether the whirling is effected in the same direction as that of the rotation of the rotary body, i.e., the forward rotation, or in the direction opposite to that of the rotation of the rotary body, i.e., the backward rotation, depending on whether the signal $a_1$ is in a lower frequency band region (a band region including the frequency of the signal indicating the backward whirling) or in a higher frequency band region (a band region including the frequency of the signal indicaating the forward whirling). The output signal $b_1$ of the decision circuit $B_1$ is processed on the basis of the rotational speed of the rotary body in the gain adjuster 8. The output signal $d_1$ transmitted from the gain adjuster 8, viz., a signal which has been adjusted according to the rotational speed, is added to the signals from the phase compensators 15 and 16 placed on axes $Y_1$ and $Y_2$, respectively, by means of the adders 27 and 30. The output signals of the adders 27 and 30 are amplified by the power amplifiers 20 and 22 on the axes $Y_1$ and $Y_2$, and then these signals are supplied respectively to the electromagnets 21 and 23 on the axes $Y_1$ and $Y_2$ in order to perform the Y-axis directional control. As will be clear from the descriptions given above, the signals applied to the electromagnets 21 and 23 are those obtained by adding the signals indicating the Y-axis directional displacement and the signals which are advanced by 90° with respect to this displacement. Using these signals, it is possible to suppress the whirling in the direction of the axes $Y_1$ and $Y_2$.

Concerning the backward whirling, the output of the low-pass filter 7 is subjected to 180-degree phase inversion by the phase inverter 28 to obtain a signal which is advanced by 90°. The thus converted signal is added to the signals transmitted from the phase compensators 15 and 16. The reason why the phase inverter 28 is needed is that the direction of phase advance of an output from the slant angle detecting circuit $A_1$ is reversed in case of the backward rotation, and thus, that the phase of this output should be inverted.

In the second place, when controlling the rotary body with respect to the axis X, the slant angle $\theta$ of the rotational axis of the rotary body is detected by the second slant angle detecting circuit $A_2$ (FIG. 3B) from the different signal $b_2$ representing the difference between the outputs from he displacement sensors 13 and 14 disposed on the axes $Y_1$ and $Y_2$, respectively. The output signal $a_2$ of the detecting circuit $A_2$ is sent to the band-pass filter 17 and the low-pass filter 18 of the decision circuit $B_2$, which in turn decides whether a frequency component contained in the signal $a_2$ falls within a higher frequency band region which includes the component indicating forwad whirling or within a lower frequency band region that includes the component indicating backward whirling. The signal relating to the backward whirling undergoes phase inversion by the phasae inverter 29. The output signal $b_2$ of the decision circuit $B_2$, i.e., the signal indicating the direction of rotation, is gain-adjusted corresponding to the rotational speed of the rotary body bythe gain adjuster 19. The output signal $d_2$ from the gain adjuster 19 is added to the signals transmitted from the phase compensators 4 and 5 on the axes $X_1$ and $X_2$ by the adders 31 and 32. The outputs of the adders 31 and 32 are amplified by the power amplifiers 9 and 11 and are then applied to the electromagnet 10 on the axis $X_1$ as well as to the electromagnet 12 on the axis $X_2$. Thus, the damping force required for performing the X-axis directional control is produced.

As discussed above, the active type magnetic bearing according to the present invention is capable of effectively suppressing or preventing unstable vibrations by detecting the whirling mode without causing either structural resonance or any increase in vibration during the rotation which is produced when increasing the capacity of a control circuit or augmenting stiffness.

Although the illustrative embodiment of the present invention has been described in detail with reference to the accompanying drawings, it is to be understood that the invention is not limited to the specific embodiment described. A variety of changes or modifications may be effected thereto by one skilled in the art without departing from the scope or spirit of the invention.

What is claimed is:

1. An unstable vibration prevention apparatus designed for a magnetic bearing system by means of which a rotary body is suspended to rotate about a rotational axis thereof in a non-contact state, comprising:
    first displacement detecting means for detecting any displacement in a radial position of said rotary body along a first axis perpendicular to the rotational axis;
    first slant angle detecting means for detecting in response to an output of said first displacement detecting means a slant angle of the rotational axis in a direction of the first axis;
    first decision means for deciding in response to an output of said first slant angle detecting means whether or not a whirling direction of said rotary body is the same as the rotational direction of said rotary body;
    second displacement detecting means for detecting any displacement of the radial position of said rotary body along a second axis which is different from the first axis and is perpendicular to the rotational axis;
    second slant angle detecting means for detecting in response to an output of said second displacement detecting means the slant angle of the rotational axis in a direction of the second axis;
    second decision means for deciding in response to an output of said second slant angle detecting means whether or not the whirling direction of said rotary body is the same asa that of the rotational direction of the rotary body;
    first adding means for adding together an output of said first displacement detecting means and an output of said second decision means; and
    second adding means for adding together an output of said second displacement detecting means and an output of said first decision means, thereby supplying outputs of said first and second adding means to said magnetic bearing system to suppress any unstable vibration of said rotary body.

2. An unstable vibration prevention apparatus as set forth in claim 1, wherein said first displacement detecting means includes displacement sensors disposed within a first plane including the rotational axis and the first axis and placed in different positions along length of said rotary body, and said second displacement detecting means includes displacement sensors disposed within a second plane which includes the second axis and is perpendicular to the first plane and placed in different positions along the length of said rotary body.

3. An unstable vibration prevention apparatus as set forth in claim 2, wherein said first and second decision means each include a band-pass filter for outputting a signal which indicates that the whirling of said rotary body is effected in the same direction as that of the rotation of said rotary body, and a low-pass filter for outputting a signal which indicates that the whirling of said rotary body is effected in a direction opposite to that of the rotation of said rotary body.

4. An unstable vibration prevention apparatus as set forth in claim 3, wherein said magnetic bearing system includes a first bearing member for suspending said rotary body on one side and a second bearing member for suspending said rotary body another side, said first and second bearing members each having electromagnets for controlling the radial position of said rotary body along the first and second axes, and wherein an output of said first adding means is supplied to the electromagnets provided on the first axis, an output of said second adding means being supplied to the electromagnets provided on the second axis.

5. An unstable vibration prevention apparatus as set forth in any one of claims 1 to 4, further comprising gain adjusting means for adjusting a magnitude of an input signal in accordance with a rotationall speed of said rotary body, said gain adjusting means adjusting a magnitude of the outputs of said first and second decision means.

6. In an active type magnetic bearing system including:
    a rotary body;
    magnetic bearings to suspend at least two portions of said rotary body in a non-contact state to permit said rotary body to rotate about a rotational axis thereof; and
    a control circuit for supplying signals for controlling a radial position of said rotary body, and said control circuit comprising:
    a first displacement sensor disposed at one end of said rotary body within a first plane that includes the rotational axis for sensing any displacement of the radial position of one end of said rotary body to generate a first displacement signal corresponding to such displacement;

a second displacement sensor disposed at another end of said rotary body within said first plane for sensing any displacement of the radial position of othe another end of said rotary body to generate a second displacement signal corresponding to such displacement;

a third displacement sensor disposed at one end of said rotary body within a second plane that includes the rotational axis vertical to the first plane for sending any displacement of the radial position of one end of said rotary body to generate a third displacementn signal corresponding to such displacement;

a fourth displacement sensor disposed at the another end of said rotary body within the second plane for sensing any displacement of the radial position of the another end of said rotary body to generate a fourth displacement signal corresponding to such displacement;

a first slant angle detecting circuit for generating a first angular signal indicating a slant angle of said rotary body within said first plane by obtaining a difference between said first and second displacement signals so as to detect a slant angle on the basis of such difference;

a first decision circuit for deciding whether or no a whirling direction of said rotary body is the same as that of a rotation of said rotary body on the basis of the first angular signal to generate a first direction signal which indicates such whirling direcion;

a second slant angle detecting circuit for generating a second angular signal which indicates the slant angle of said rotary body within the second plane by obtaining a difference between said third and fourth displacement signals to detect a slant angle on the basis of such difference;

a second decision circuit for deciding whether or not the whirling direction of said rotary body is the same as that of the rotation of said rotary body on the basis of the second angular signal to generate a second direction signal which indicates such whirling direction;

a first adding circuit for adding together the second direction signal and the first and second displacement signals; and a second adding circuit for adding together the first direction signal and the third and fourth displacement signals, thereby controlling the whirling of said rotary body within the first plane by utilizing an ouput of said first adding circuit, and controlling the whirling of said rotary body within the second plane by utilizing an output of said second adding circuit.

7. A control circuit as set forth in claim 6, wherein said first and second decision circuits each include a band-pass filter for outputting a signal which indicates that the whirling direction of said rotary body is the same as that of the rotation of said rotary body, and a low-pass filter for outputting a signal which indicates that the whirling direction of said rotary body is opposite to that of the rotation of said rotary body.

8. A control circuit as set forth in claim 7, wherein said magnetic bearing includes a first bearing member for suspending said rotary body on one side and a second bearing member for suspending said rotary body on the another side, said first and second bearing members each have electromagnets for controlling the radial position of said rotary body within said first and second planes, an output of said first adding circuit is supplied to said electromagnets provided within said first plane, and an output of said second adding circuit is supplied to said electromagnets provided within said second plane.

9. A control circuit as set forth in any one of claims 6 to 8, further comprising gain adjusting means for adjusting a magnitude of an input signal in accordance with a rotational speed of said rotary body, said gain adjusting means adjusting a magnitudes of the outputs of said first and second decision circuits.

* * * * *